(No Model.)

G. CARLYLE.
CALIPERS.

No. 425,208. Patented Apr. 8, 1890.

Witnesses:
John Schuman.
Effie J. Croft.

Inventor:
George Carlyle
by Parker & Burton,
his Att'ys

UNITED STATES PATENT OFFICE.

GEORGE CARLYLE, OF DETROIT, MICHIGAN, ASSIGNOR OF ONE-HALF TO GEORGE MAITLAND, OF SAME PLACE.

CALIPERS.

SPECIFICATION forming part of Letters Patent No. 425,208, dated April 8, 1890.

Application filed January 31, 1889. Serial No. 298,275. (No model.)

*To all whom it may concern:*

Be it known that I, GEORGE CARLYLE, a citizen of the United States, residing at Detroit, in the county of Wayne and State of Michigan, have invented a new and useful Improvement in Calipers, of which the following is a specification.

This invention relates to an improved form of calipers, and has for its object the production of a form of calipers by means of which the size of an object interposed between the legs may be accurately determined, and by means of which a workman can accurately size to a pattern any article adapted to be measured by this class of tools.

Figure 1:
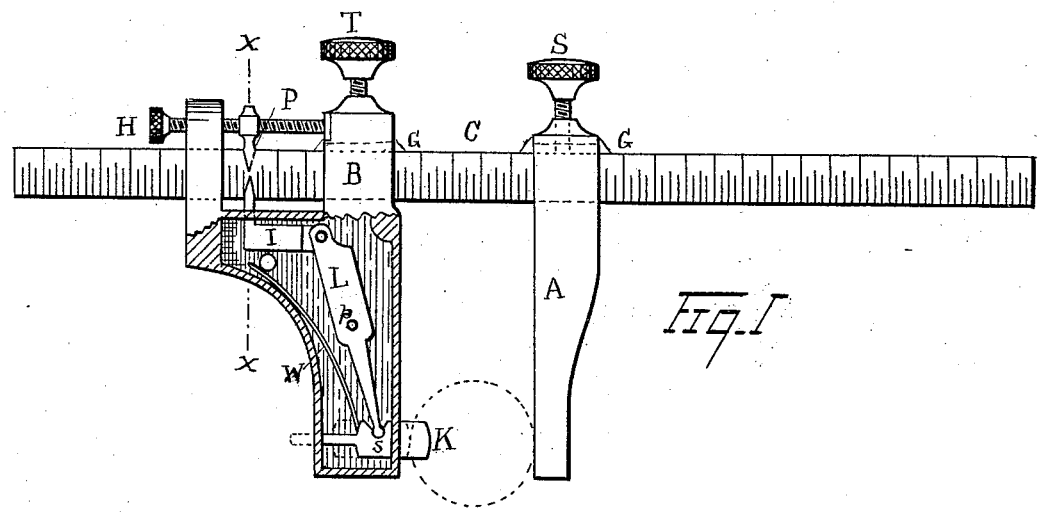
Figure 2:
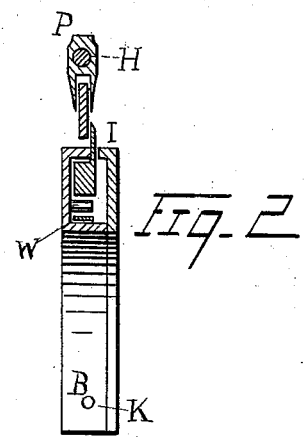

Figure 1 shows an elevation of a calipers having my improvement upon it. A part of the front of the leg B is cut away to show the interior mechanism. Fig. 2 shows a section through the line $x\ x$ of Fig. 1.

C is a flat graduated measuring-scale, upon which the leg A slides freely, or to which the leg A may be tightly clamped by means of the set-screw S. The leg A is a simple bar of metal perforated at one end with a perforation, through which the graduated scale C and the gib G can pass, and in which the scale and gib fit snugly.

The leg B of the calipers is forked at its upper end and has perforations through each of the branches of the fork for the passage of the scale C. The leg B also moves freely on the scale when not held to it by the set-screw T. An endless screw H is journaled in the forks of the leg B, and carries on the part thereof which lies between the forks a pointer P. The pointer P is forked at its lower end, and one branch of the fork extends down on either side of the scale C.

Through the foot of the leg B extends a sliding contact-piece K, having on its upper side a socket $s$ for the reception of a ball on the end of a lever L, which is hung on a pin $p$. The upper end of the lever L is linked to a sliding indicator I, a part of which, extended in the form of a point, (or, if it be desired, in the form of a small graduated scale,) extends out through an opening between the forks of the leg B. A light spring W is placed behind the sliding contact-piece K and forces it inward toward the leg A the extent of its throw in that direction.

The gib G is used to protect the scale from injury when the set-screws are turned down to hold the legs in place.

Having thus described the mechanism, the method of operation will be readily seen to be as follows: The leg A is clamped to the scale at any desired part, and the leg B is then clamped to the scale at a sufficient distance away from the leg A, so that the distance between the feet will be somewhat greater and the distance between the inner edge of the contact-piece K and the foot of A will be somewhat less than the size of the article to be measured. Then the article to be measured is interposed between the leg A and the contact-piece K, and the contact-piece is forced back against the spring W and the indicator I drawn inward along the scale C. The screw H is now turned until the pointer P is exactly opposite the indicator I. The tool is now set in position to compare any other article with the one just measured, as the position of the pointer P and point of the indicator I will show at a glance whether any object interposed between K and A is greater, less, or equal to the object which was interposed there when the pointer P was set.

Having thus described my invention, what I claim as novel, and desire to have secured to me by Letters Patent, is—

1. In combination with one leg of a calipers, a movable contact-piece, a movable indicating-point, a link connecting the two, and a second movable indicating-pointer sliding on the caliper-bar, and a graduated caliper-bar upon which are mounted both legs of the calipers, substantially as and for the purpose described.

2. In combination with a leg of a calipers, a movable pointer controlled by a movable contact-piece and a movable pointer mounted upon and controlled by a screw journaled in the caliper-leg, substantially as and for the purpose described.

3. The combination of the graduated scale C, caliper-legs A and B, the sliding pointer P, and the endless screw H, substantially as and for the purpose described.

GEORGE CARLYLE.

Witnesses:
CHARLES H. FISK,
EFFIE I. CROFT.